(12) United States Patent
Saito et al.

(10) Patent No.: US 7,212,717 B2
(45) Date of Patent: May 1, 2007

(54) OPTICAL FIBER

(75) Inventors: Tatsuhiko Saito, Yokohama (JP);
Kenichiro Takahashi, Yokohama (JP);
Tetsutarou Katayama, Yokohama (JP)

(73) Assignee: Sumitomo Electric Industries, Ltd.,
Osaka (JP)

( * ) Notice: Subject to any disclaimer, the term of this patent is extended or adjusted under 35 U.S.C. 154(b) by 0 days.

(21) Appl. No.: 11/262,965

(22) Filed: Nov. 1, 2005

(65) Prior Publication Data
US 2006/0159410 A1 Jul. 20, 2006

(30) Foreign Application Priority Data
Nov. 1, 2004 (JP) ............................. P2004-318192
Nov. 11, 2004 (JP) ............................. P2004-327936

(51) Int. Cl.
*G02B 6/02* (2006.01)
(52) U.S. Cl. ....................................... 385/125; 385/126
(58) Field of Classification Search ...................... None
See application file for complete search history.

(56) References Cited

U.S. PATENT DOCUMENTS

| 6,577,801 B2 * | 6/2003 | Broderick et al. ........... 385/125 |
| 6,915,053 B2 * | 7/2005 | Hasegawa .................... 385/124 |
| 2004/0175084 A1 * | 9/2004 | Broeng et al. ............... 385/125 |

OTHER PUBLICATIONS

K.P. Hansen, et al., "Fully Dispersion Controlled Triangular-Core Nonlinear Photonic Crystal Fiber," OFC2003, PD2, Optical Society of America.
K.P. Hansen, "Dispersion flattened hybrid-core nonlinear photonic crystal fiber," Optics Express, Jun. 30, 2003, pp. 1503-1509, vol. 11, No. 13, Optical Society of America.

* cited by examiner

*Primary Examiner*—Sung Pak
*Assistant Examiner*—Tina M. Wong
(74) *Attorney, Agent, or Firm*—McDermott Will & Emery LLP (57) ABSTRACT

The present invention relates to an optical fiber having a configuration which enables utilization of nonlinear phenomena in the near-infrared region. The optical fiber is directed to a holey fiber having a core region extending along a predetermined axis and a cladding region with plural holes arranged along the core region. The plural holes are arranged to constitute plural layers about the core region in the cross-section orthogonal to the predetermined axis. The three holes constituting the first layer (the innermost layer) closest to the core region correspond to three vertexes from among the six vertexes of a regular hexagon and are placed such that the arrangement of the three holes has three-fold rotational symmetry. The optical fiber enables utilization of nonlinear phenomena in the near-infrared region, by properly adjusting the hole diameter d and the pitch L between adjacent holes from among the holes constituting a single layer.

12 Claims, 12 Drawing Sheets

OPTICAL FIBER

BACKGROUND OF THE INVENTION

1. Field of the Invention

The present invention relates to a so-called holey fiber comprising a solid core region and a cladding region in which plural holes extending along the core region are provided.

2. Related Background Art

Figure 1:
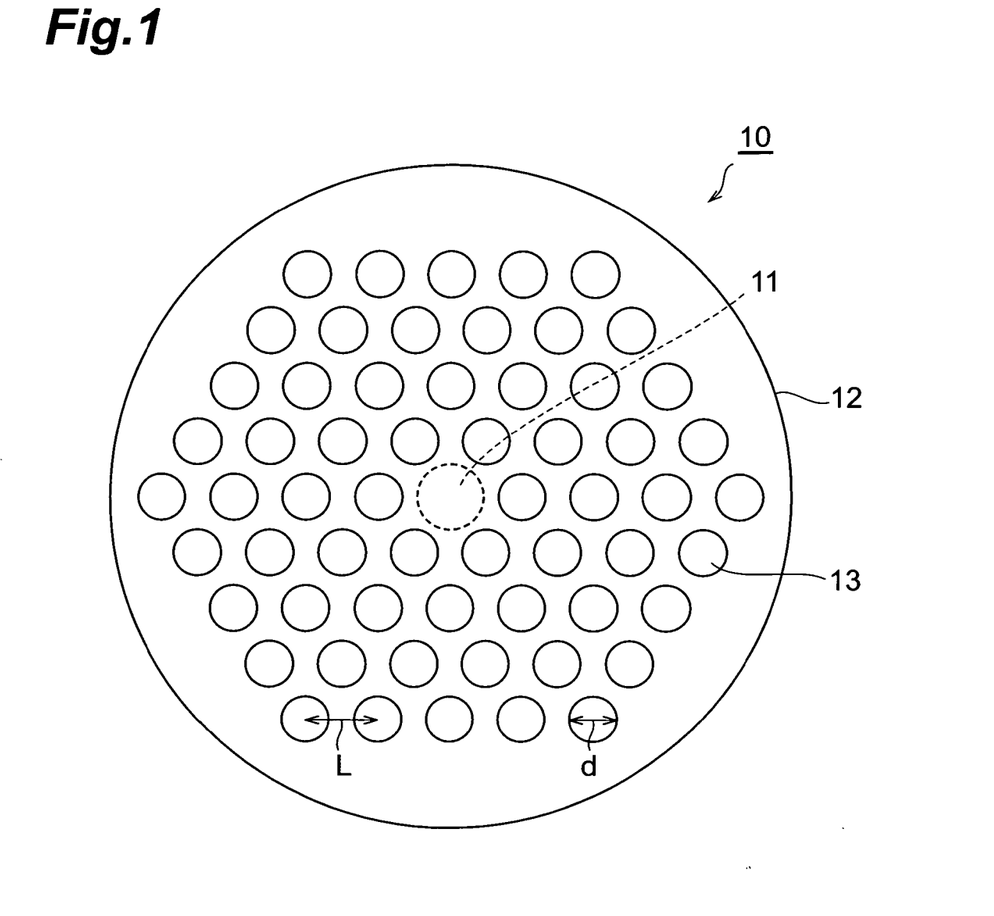
FIG. 1 is a view illustrating the cross-sectional configuration of a conventional holey fiber.

A so-called holey fiber comprises a solid core region extending along a longitudinal direction of the fiber and a cladding region in which plural holes, extending along the core region while surrounding the core region, are provided. FIG. 1 is a view illustrating the cross-sectional configuration of a conventional holey fiber 10. There is illustrated, in FIG. 1, the arrangement of the plural holes 13 in a cross section orthogonal to the longitudinal direction of the holey fiber 10. In FIG. 1, circles illustrated by a solid line in the cladding region 12 represent holes 13. On the other hand, circles illustrated by a dot line do not represent holes, but represent regions or positions (the same applies to FIGS. 2 and 3 which will be described later).

As illustrated in FIG. 1, the holey fiber 10 comprises a solid core region 11 existing at the center portion of the fiber 10 and extending along the longitudinal direction of the fiber 10 (the direction perpendicular to the paper face) and a cladding region 12 surrounding the core region 11. In the cladding region 12, there are provided plural holes 13 having a round-shaped cross-section and extending along the longitudinal direction of the fiber 10. The portion of the cladding region 12 other than the holes 13 and the core region 11 are comprised of silica glass and may occasionally contain secondary constituents or dopants to be added. In the cross-section orthogonal to the longitudinal direction, the plural holes 13 in the cladding region 22 are arranged so as to constitute plural layers (four layers in FIG. 1) about the core region 11. More specifically, the holes 13 constituting the respective layers are arranged so as to have six-fold rotational symmetry about the core region 11.

The six holes 13 constituting the first layer (the innermost layer) closest to the core region 11 are provided at six vertexes of a regular hexagon. The twelve holes 13 constituting the second layer (the second layer from the core region 11) are placed at the six vertexes of a regular hexagon and the middle points of the respective sides of the regular hexagon. The eighteen holes 13 constituting the third layer (the third layer from the core region 11) are placed at the six vertexes of a regular hexagon and the points trisecting the respective sides of the regular hexagon. The twenty-four holes 13 constituting the fourth layer (the forth layer from the core region 21) are placed at the six vertexes of a regular hexagon and the points quadrisect the respective sides of the regular hexagon. The regular hexagons of the respective layers have the same center position and the same orientation. The pitch L between adjacent holes 13 from among the holes 13 constituting the respective layers (the distance between the center positions of adjacent holes 13) is uniform. Further, the diameters d of the total of sixty holes 13 are generally uniform.

By properly designing the pitch L of the arranged holes 13, the diameter d and the like, the holey fiber 10 having the aforementioned configuration enables a greater absolute chromatic-dispersion value than those of standard optical fibers having an entirely-solid configuration and enables larger nonlinearity than those of conventional highly-nonlinear fibers. Further, it is possible to reduce the bending loss. Therefore, researches and developments have been conducted about holey fibers utilizing the characteristics as stated above.

For example, in a holey fiber described in Document 1 (K. P. Hansen, et al., "Fully Dispersion Controlled Triangular-Core Nonlinear Photonic Crystal Fiber", OFC2003, PD2), a apart of the holes in the first layer closest to the core region are omitted. This holey fiber enables substantially zero chromatic dispersion, a small absolute dispersion slope and large nonlinearity, near a wavelength of 1.55 μm which is generally used as a signal light wavelength region in optical communication. By employing the holey fiber described in Document 1, it is possible to develop a nonlinear optical phenomenon, with a high efficiency, near a wavelength of 1.55 μm, whereby it is to be expected to realize various types of applications.

SUMMARY OF THE INVENTION

The inventors have studied the conventional holey fibers in detail, and as a result, have found problems as follows.

Namely, holey fibers generally have significantly large transmission losses near a wavelength of 1.55 μm, as compared with standard optical fibers having entirely solid configurations. The holey fiber described in Document 1 enables nonlinearity (nonlinearity coefficient) of about 12/W/km, which is equivalent to or slightly less than those of highly-nonlinear optical fibers having a solid configuration. However, the holey fiber has a transmission loss of about 10 dB/km, which is greater by substantially one order of magnitude than those of highly-nonlinear optical fibers having a solid configuration. Consequently, the holey fiber exhibits by one order of magnitude smaller ratio of the nonlinearity coefficient to the transmission loss (nonlinearity-coefficient/transmission-loss) than those of solid optical fibers, wherein the aforementioned ratio signifies the efficiency pertaining to development of a nonlinear phenomenon. Furthermore, the holey fiber suffers a lower ratio of the absolute chromatic-dispersion value to the transmission loss (absolute-chromatic-dispersion-value/transmission-loss) than those of standard optical fibers, in the signal light wavelength range which is generally used for optical communication. Another problem is that the manufacturing costs of holey fibers are high. For these reasons, it has been difficult to put holey fibers to practical use in the signal light wavelength range which is generally used for optical communication.

On the other hand, the standard optical fiber having a solid configuration usually has a negative chromatic dispersion (normal dispersion) in the wavelength range smaller than a wavelength of 1.3 μm in the near-infrared region. In general, in order to develop nonlinear phenomena, it is preferable that the chromatic dispersion is close to zero dispersion, and therefore it is necessary that the fiber characteristics are adjusted such that the chromatic dispersion becomes zero dispersion at the wavelength of light to be used. However, with solid optical fibers, it is almost impossible to realize the aforementioned characteristics in the wavelength region smaller than a wavelength of 1.3 μm. With holey fibers, it is possible to shift zero dispersion to the wavelength range of 0.6 to 1.3 μm. Therefore, holey fibers can be advantageous over common optical fibers in the wavelength range as stated above.

However, the conventional holey fiber illustrated in FIG. 1 has a narrow manufacturing tolerance, since a slight change of its configuration (the pitch L of the arranged holes and the hole diameter d) causes a significant change in the dispersion characteristic. On the other hand, even though the conventional holey fiber illustrated in FIG. 1 enables zero dispersion in the wavelength range smaller than a wavelength of 1.3 µm in the near-infrared region, it is to be accompanied by a large dispersion slope near the zero dispersion. In the case of utilization of the nonlinear phenomenon such as in generating SC (Super Continuum) light, it is preferable that the dispersion characteristic is such that near-zero dispersion values can be retained over a wider wavelength range. However in the conventional holey fiber, because of a large dispersion slope, a dispersion characteristic close to zero dispersion has been available in only a narrow wavelength range.

In order to overcome the above-mentioned problems, it is an object of the present invention to provide an optical fiber enabling utilization of nonlinear phenomena in the near-infrared region.

An optical fiber according to the present invention relates to a holey fiber comprising a solid core region extending along a predetermined axis, and a cladding region provided on the outer periphery of the core region, the cladding region being provided with plural holes that extend along the core region and that are arranged so as to constitute plural layers about the core region in the cross-section orthogonal to the predetermined axis. In the cross-section orthogonal to the predetermined axis, at least the holes, that are among the plural holes provided in the cladding region and constitutes the innermost layer closest to the core region, are arranged such that the arrangement thereof has N-fold rotational symmetry about the core region (N is an integer of three or more) while the holes constituting the respective layers except the innermost layer are arranged such that the arrangement thereof has 2N-fold rotational symmetry about the core region.

In the case of realizing a holey fiber having a large manufacturing tolerance having as well as significant nonlinearity in the wavelength range of 700 to 900 nm in the near-infrared region, it is preferable that the holes constituting any of the plural layers are arranged with a pitch of L and the ratio (d/L) between the pitch L and the hole diameter d is 0.55 or more.

More preferably, the ratio (d/L) is 0.6 or more and the pitch L falls within the range between 0.7 µm and 1.3 µm.

Further, it is preferable that the optical fiber according to the present invention has a twist formed about the predetermined axis. Further, preferably, the orientation of the twist formed in the optical fiber is reversed at least once along the predetermined axis.

In the case of realizing a holey fiber having a dispersion characteristic near zero dispersion around a wavelength of 1 µm in the near-infrared region, it is preferable that the optical fiber has a chromatic dispersion between −20 ps/nm/km and +20 ps/nm/km, as characteristics in the wavelength range of 900 to 1200 nm. More specifically, the optical fiber has the chromatic dispersion between −10 ps/nm/km and +10 ps/nm/km, in the aforementioned wavelength range or less.

In order to realize a holey fiber having a dispersion characteristic close to zero dispersion around a wavelength of 1 µm in the near-infrared region, at least the holes, that are among the plural holes provided in the cladding region and constitutes the innermost layer closest to the core region, are arranged such that arrangement thereof has N-fold rotational symmetry about the core region N (N is an integer of three or more) while the holes constituting the respective layers except the innermost layer are arranged such that arrangement thereof has 2N-fold rotational symmetry about the core region, in the cross-section orthogonal to the predetermined axis.

In order to realize a holey fiber having a dispersion characteristic close to zero dispersion near a wavelength of 1 µm in the near-infrared region with the optical fiber according to the present invention, it is preferable that the ratio (d/L) between the pitch L of the arranged holes and the hole diameter d falls within the range of 0.45 to 0.60. Further, the pitch L preferably falls within the range of 0.9 to 1.3 µm.

In order to realize a holey fiber having a dispersion characteristic close to zero dispersion near a wavelength of 1 µm in the near-infrared region, it is preferable that the optical fiber according to the present invention has a twist about the predetermined axis and further, it is preferable that the orientation of the twist in the optical fiber is reversed at least once along the predetermined axis.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of an optical fiber according to the present invention will be explained in detail with reference to FIGS. 2 to 12. In the explanation of the drawings, constituents identical to each other will be referred to with numerals identical to each other without repeating their overlapping descriptions.

First Embodiment

Figure 2:
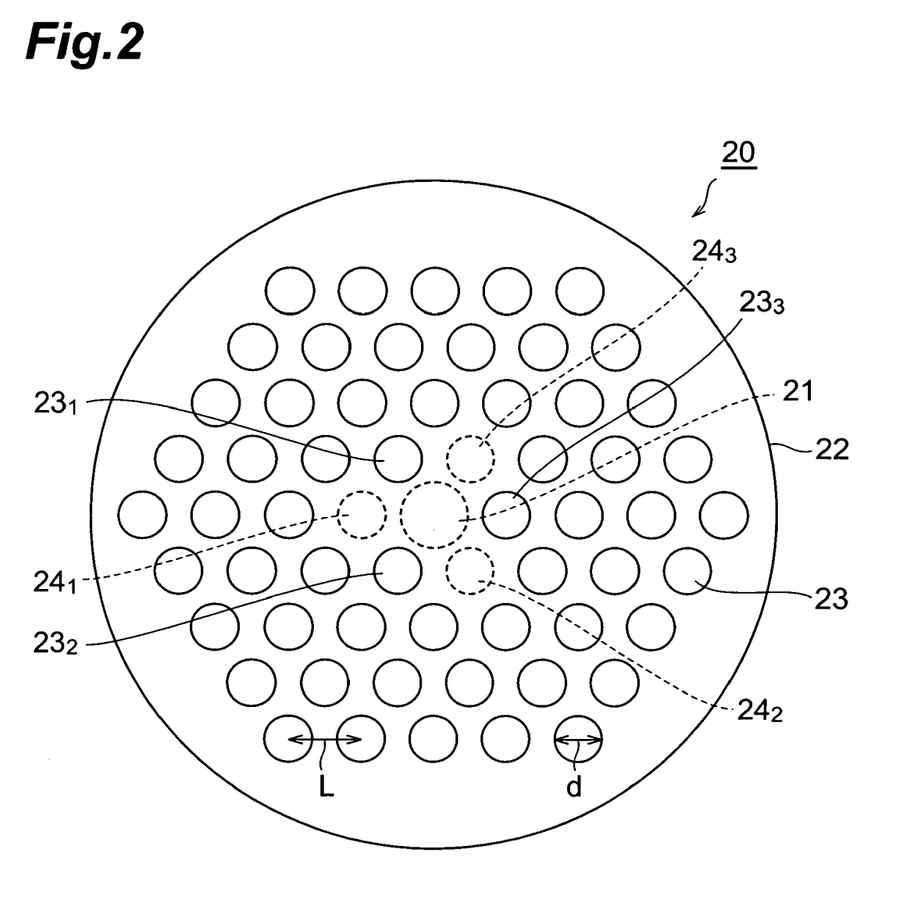
FIG. 2 is a view illustrating the cross-sectional configuration of an optical fiber according to a first embodiment of the present invention.

First, a first embodiment of an optical fiber according to the present invention will be described. FIG. 2 is a view illustrating the cross-sectional configuration of the optical fiber according to the first embodiment of the present invention. There is illustrated, in FIG. 2, the placement of plural holes 23 in a cross section orthogonal to the longitudinal direction of the optical fiber 20 according to the first embodiment.

The optical fiber 20 according to the first embodiment comprises a solid core region 21 extending along the longitudinal direction of the fiber 20 (the direction perpendicular to the paper face) and a cladding region 22 provided around the outer periphery of the core region 21, wherein there are provided, in the cladding region 22, with the plural holes 23 having a round-shaped cross-section and extending along the longitudinal direction. The portion of the cladding region 22 other than the holes 23 and the core region 21 are constituted of silica glass and may contain secondary constituents or dopants. In the cross-section orthogonal to the longitudinal direction, the plural holes 23 in the cladding region 22 are arranged so as to constitute plural layers (four layers in FIG. 2) about the core region 21.

The three holes 23 constituting the first layer (the innermost layer) closest to the core region 21 are provided alternately at three vertexes from among the six vertexes of a regular hexagon. The twelve holes 23 constituting the second layer (the second layer from the core region 21) are placed at the six vertexes of a regular hexagon and the middle points of the respective sides of the regular hexagon. The eighteen holes 23 constituting the third layer (the third layer from the core region 21) are placed at the six vertexes of a regular hexagon and the points trisecting the respective sides of the regular hexagon. The twenty-four holes 23 constituting the fourth layer (the fourth layer from the core region 21) are placed at the six vertexes of a regular hexagon and the points quadrisecting the respective sides of the regular hexagon. Namely, the three holes 23 constituting the first layer are placed such that the arrangement thereof has three-fold rotational symmetry about the core region. The holes 23 constituting the second, third and fourth layers are placed such that the arrangement thereof has six-fold rotational symmetry about the core region 21.

The placement of the holes 23 in the cross-section of the optical fiber 20 according to the first embodiment illustrated in FIG. 2 is different from the placement of the holes 13 in the cross-section of the conventional optical fiber 10 illustrated in FIG. 1 in that the holes $23_1$ to $23_3$ are provided alternately at three points from among the six vertexes of the regular hexagon of the first layer while no holes are provided at the other three vertexes $24_1$ to $24_3$. It is preferable that the regions $24_1$ to $24_3$ are comprised of the same material as that of the portion of the cladding region 22 other than the holes 23. Also, this material may contain secondary constituents or dopants (for example, Ge, Ti, F, B, rare-earth elements, etc.).

In particular, in the case of utilizing the optical fiber 20 according to the first embodiment for realizing a holey fiber having a large manufacturing tolerance and having large nonlinearity over the wavelength range of 700 to 900 nm in the near-infrared range, the ratio between the pitch L of the arranged holes and the hole diameter d in each layer is preferably equal to or greater than 0.55 and is more preferably equal to or greater then 0.6. Further, it is preferable that the pitch L falls within the range between 0.7 μm and 1.3 μm.

The optical fiber 20 having the aforementioned configuration can realize a large manufacturing tolerance and can exhibit significant nonlinearity over the wavelength range of 700 to 900 nm in the near-infrared range. When laser light with a wavelength of about 800 nm output from a semiconductor layer source or a Ti sapphire laser light source is introduced into the optical fiber 20, the optical fiber 20 can output SC (Super Continuum) light over a wide range including a wavelength of 800 nm with a high efficiency.

On the other hand, in the case of employing the optical fiber 20 according to the first embodiment for realizing a holey fiber having a dispersion characteristic near zero-dispersion around a wavelength of 1 μm in the near-infrared range, the chromatic dispersion of this optical fiber is, preferably, in the range between −20 ps/nm/km and +20 ps/nm/km and is, more preferably, in the range between −10 ps/nm/km and +10 ps/nm/km, over the wavelength range of 900 to 1200 nm. It is preferable that the ratio (d/L) between the pitch L of the arranged holes 23 and the diameter d of the holes 23 falls within the range between 0.45 and 0.60. Further, the pitch L may falls within the range between 0.9 μm and 1.3 μm.

The optical fiber 20 having the aforementioned configuration can realize a dispersion characteristic near zero-dispersion over a wider range around 1 μm in the near-infrared range and can exhibit significant nonlinearity. When laser light with a wavelength of about 1060 nm output from an Yb laser light source is introduced into the optical fiber 20, the optical fiber 20 can output SC (Super Continuum) light over a wider range around a wavelength of 1 μm with a high efficiency.

Second Embodiment

Figure 3:
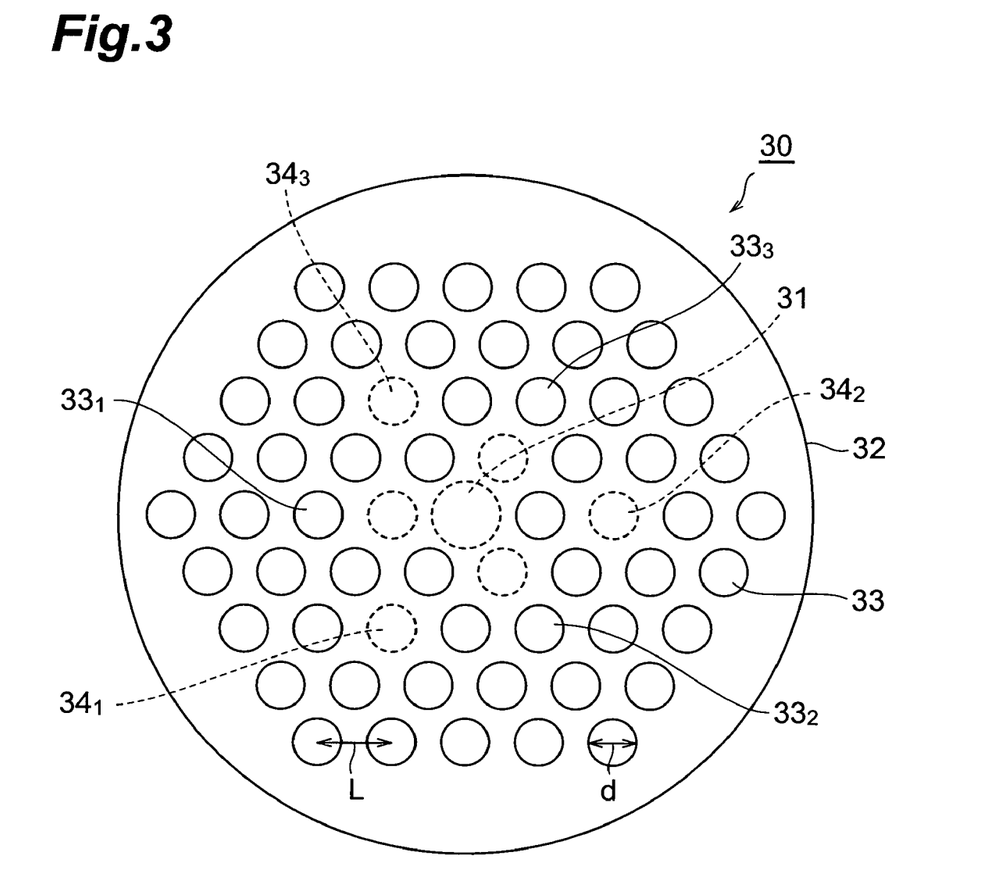
FIG. 3 is a view illustrating the cross-sectional configuration of an optical fiber according to a second embodiment of the present invention.

First, a second embodiment of an optical fiber according to the present invention will be described. FIG. 3 is a view illustrating a cross-sectional configuration of the optical fiber according to the second embodiment of the present invention. There is similarly illustrated, in FIG. 3, the placement of plural holes 33 in a cross-section orthogonal to the longitudinal direction of the optical fiber 30.

The optical fiber 30 according to the second embodiment illustrated in FIG. 3 comprises a solid core region 31 extending along the longitudinal direction of the fiber 30 (the direction perpendicular to the paper) and a cladding region 32 provided around the outer periphery of the core region 31, wherein there are provided, in the cladding region 32, with the plural holes 33 having a round-shaped cross-section and extending along the longitudinal direction. The portion of the cladding region 32 other than the holes 33 and the core region 31 are comprised of silica glass and may contain secondary constituents or dopants. In the cross-section orthogonal to the longitudinal direction, the plural holes 33 in the cladding region 32 are arranged so as to constitute plural layers (four layers in FIG. 3) about the center of the core region 31.

The three holes 33 constituting the first layer (the innermost layer) closest to the core region 31 are placed alternately at three vertexes from among the six vertexes of a regular hexagon. The nine holes 33 constituting the second layer (the second layer from the core region 31) are placed alternately at three vertexes from among the six vertexes of a regular hexagon and at the middle points of the respective sides of the regular hexagon. The eighteen holes 23 constituting the third layer (the third layer from the core region 31) are placed at the six vertexes of a regular hexagon and at the points trisecting the respective sides of the regular hexagon. The twenty-four holes 33 constituting the fourth layer (the fourth layer from the core region 31) are placed at the six vertexes of a regular hexagon and at the points quadrisecting the respective sides of the regular hexagon. Namely, the holes 33 constituting each of the first and second layers are placed such that the arrangement thereof has three-fold rotational symmetry about the core region 31. The holes 33 constituting each of the third and fourth layers are placed such that the arrangement thereof has six-fold rotational symmetry about the core region 31.

The placement of the holes 33 in the cross-section of the optical fiber 30 according to the second embodiment is different from the placement of the holes 23 in the cross-section of the optical fiber 20 illustrated in FIG. 2 in that the holes $33_1$ to $33_3$ are provided alternately at three vertexes from among the six vertexes of the regular hexagon of the second layer while no holes are provided at the other three vertexes $34_1$ to $34_3$. It is preferable that the regions $34_1$ to $34_3$ are comprised of the same material as that of the portion of the cladding region 32 other than the holes 33. Also, this material may contain secondary constituents or dopants (for example, Ge, Ti, F, B, rare-earth elements).

In particular, in the case of employing the optical fiber 30 according to the second embodiment for realizing a holey fiber having a large manufacturing tolerance and having large nonlinearity over the wavelength range of 700 to 900 nm in the near-infrared range, the ratio between the pitch L of the arranged holes and the hole diameter d in each layer is, preferably, equal to or more than 0.55 and is, more preferably, equal to or more than 0.6. Further, it is preferable that the pitch L falls within the range between 0.7 μm and 1.3 μm.

The optical fiber 30 having the aforementioned configuration can similarly have a large manufacturing tolerance and can exhibit large nonlinearity over the wavelength range of 700 to 900 nm in the near-infrared range. When laser light with a wavelength of about 800 nm output from a semiconductor layer source or a Ti sapphire laser light source is introduced into the optical fiber 30, the optical fiber 30 can output SC light over a wider range including a wavelength of 800 nm, with a high efficiency.

On the other hand, in the case of utilizing the optical fiber 30 according to the second embodiment for realizing a holey fiber having a dispersion characteristic near zero-dispersion around a wavelength of 1 μm in the near-infrared range, the chromatic dispersion of this optical fiber is preferably in the range between −20 ps/nm/km and +20 ps/nm/km and is more preferably in the range between −10 ps/nm/km and +10 ps/nm/km, over the wavelength range of 900 to 1200 nm. It is preferable that the ratio (d/L) between the pitch L of the arranged holes 23 and the diameter d of the holes 23 falls within the range between 0.45 and 0.60. Further, the pitch L may falls within the range between 0.9 μm and 1.3 μmm.

The optical fiber 30 having the aforementioned configuration can exhibit large nonlinearity and can realize a dispersion characteristic near zero-dispersion over a wider range around a wavelength of 1 μm in the near-infrared range. When laser light with a wavelength of about 1060 nm output from an Yb laser light source is introduced into the optical fiber 30, the optical fiber 30 can output SC (Super Continuum) light over a wider range around a wavelength of 1 μm with a high efficiency.

Modified Embodiment

In the optical fiber 20 according to the first embodiment having the aforementioned configuration (FIG. 2), the holes 23 constituting the first layer closest to the core region 21 are placed such that the arrangement thereof has three-fold rotational symmetry about the core region 21. Further, the holes 23 constituting the respective remaining layers are placed such that the arrangement thereof has six-fold rotational symmetry about the core region 21. On the other hand, in the optical fiber 30 according to the second embodiment (FIG. 3), the holes 33 constituting the first and second layers positioned in order from the core region 31 are placed such that the arrangement thereof has three-fold rotational symmetry about the core region 31. The holes 33 constituting the remaining third and fourth layers are placed such that the arrangement thereof has six-fold rotational symmetry about the core region 31. Here, it is preferable that the center of the hole arrangement corresponds to the center of the core region.

In each of the optical fibers 20 and 30, holes in the cladding region substantially straightly extend along the core region. Accordingly, in the optical fibers 20 and 30 according to the first and second embodiments, the polarization modes in the two directions (the directions of the X axis and the Y axis) perpendicular to the longitudinal direction each of the fibers 20 and 30 (the direction of the Z axis) are degenerated. Therefore, in theory, it is expected that the polarization mode dispersions in the optical fibers 20 and 30 are as small as those of common optical fibers. However, the optical fibers 20 and 30 have low rotational symmetries about the Z axis and, therefore, slight degradation of their symmetries will exert large influences on the polarization mode dispersion therein. Consequently, actually-fabricated optical fibers 20 and 30 tend to exhibit polarization mode dispersion greater than those of common fibers.

Therefore, it is preferable to form a twist in the optical fibers 20 and 30 about the longitudinal direction thereof Further, it is preferable that the direction of such a twist is reversed at least once along the longitudinal direction. With the optical fibers 20 and 30 provided with such a twist, it is possible to suppress the accumulation of polarization mode dispersion. The formation of such a twist in the optical fibers 20, 30 can be attained during drawing of the optical fiber preform. It is possible to form a twist in the fibers 20 and 30 such that the holes extends along a spiral shape, which makes compensation, in the longitudinal direction, for the polarization mode dispersion caused by degradation of the core symmetry.

Figure 4A:
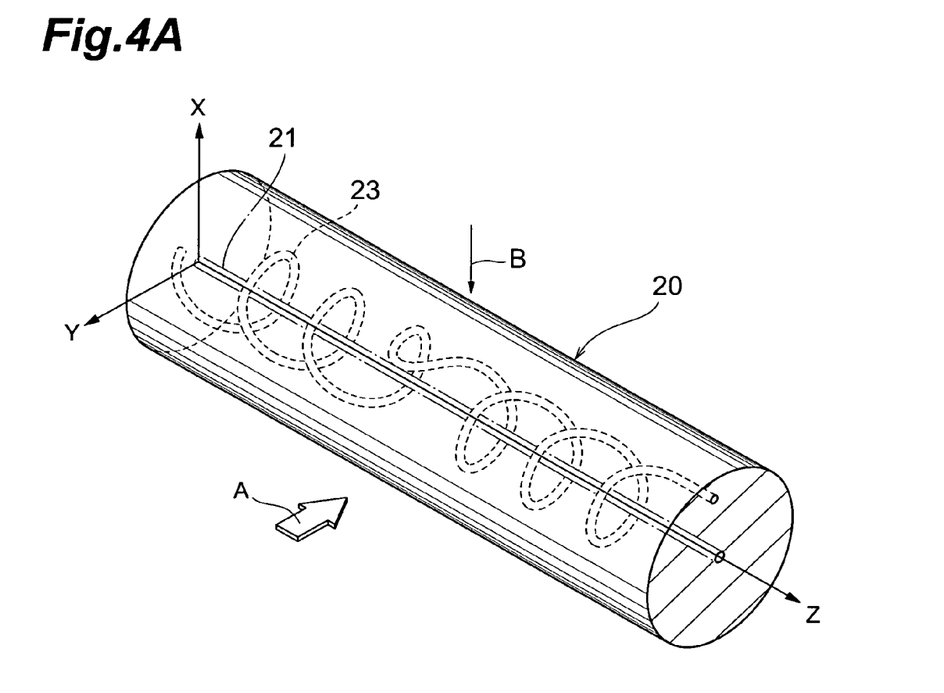
FIGS. 4A and 4B are views illustrating the configuration of the optical fiber having a twist according to the first embodiment.
Figure 4B:
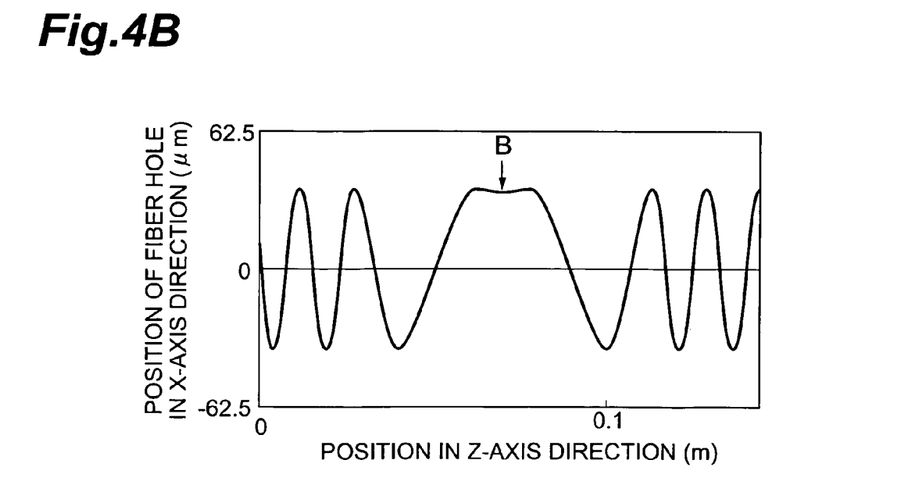

FIG. 4A and FIG. 4B are views illustrating the formation of a twist in the optical fiber 20. FIG. 4A is a perspective view of a portion of the optical fiber 20. In order to describe the twist of the optical fiber 20, only a single hole 23 is illustrated by a broken line. The direction of the center axis L of the optical fiber 20 is illustrated as a Z-axis. Further, there are illustrated, as an X-axis and a Y-axis, the directions orthogonal to each other in the cross-section orthogonal to the Z-axis. FIG. 4B is a view illustrating the position of each hole 23 in the direction of X-axis, when the optical fiber 20 is viewed along the direction of the Y-axis (the direction of arrow A). In FIG. 4B, the horizontal axis represents the distance in the direction of Z-axis while the vertical axis represents the position of each hole 23 in the direction of X-axis, wherein a position of 0 (µm) corresponds to the position of the center axis L. As can be seen from the variation of the position of each hole 23 along the direction of Z-axis illustrated in FIG. 4A and FIG. 4B, the twist is formed such that the direction of twist is reversed near the position designated by an arrow B. Further, as illustrated in FIG. 4B, the twist is formed such that the hole 23 is rotated at least once about the Z-axis, in a length of 1 m.

In the case of embedding glass in holes in the second layer and the layers outside thereof (the outer layers), it is desirable that the layers are designed such that the arrangement of the holes has three or more fold rotational symmetry, in order to prevent the occurrence of dependence of polarization. Although the holes in outer layers have less influence on the optical characteristics than the holes in the first layer, degradation of the symmetry of the hole placement therein will degrade the polarization mode dispersion.

The present invention is not intended to be limited to the aforementioned embodiments and various types of modification may be made therein. For example, the number of layers of holes around the core region is not limited to four and may be three or five or more. Further, the holes constituting each of the third layer and the layers outside thereof may be placed such that the arrangement thereof has three-fold rotational symmetry about the core region. Further, in the second embodiment, the placement of the holes in the first and second layers is not limited to the aforementioned placement.

Even when some holes in outer layers are filled with glass, this will exert little influence on the optical characteristics such as the wavelength dispersion, as previously described. However, when many holes are filled with glass, this will increase the average refractive index of the cladding region, thus degrading the effect of confining light in the core region. Consequently, when an excessive number of holes are filled with glass, this will induce problems such as increase in the bending loss or impossibility of guiding of light. Therefore, it is not preferable to fill an excessive number of holes with glass.

(First Simulations with Calculator)

Next, there will be illustrate the result of simulations for the conventional optical fiber 10 (FIG. 1), the optical fiber 20 according to the first embodiment (FIG. 2) and the optical fiber 30 according to the second embodiment (FIG. 3), in the case of realizing a holey fiber having a high manufacturing tolerance and having significant nonlinearity over the wavelength range of 700 to 900 nm in the near-infrared range.

Figure 5:
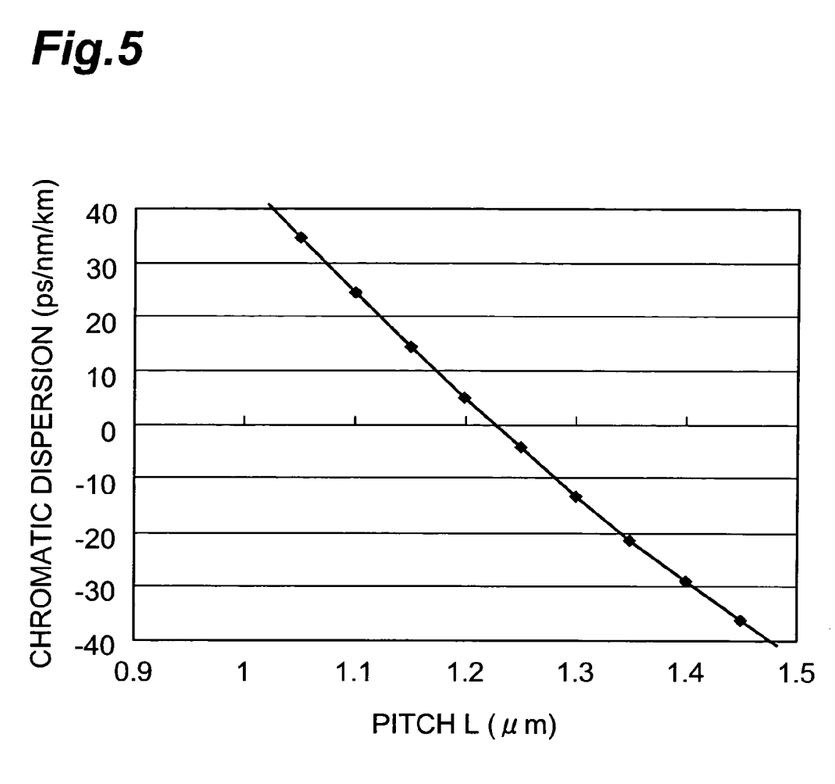
FIG. 5 is a graph illustrating the relationship between the chromatic dispersion and the pitch L, with respect to the conventional optical fiber illustrated in FIG. 1.
Figure 6:
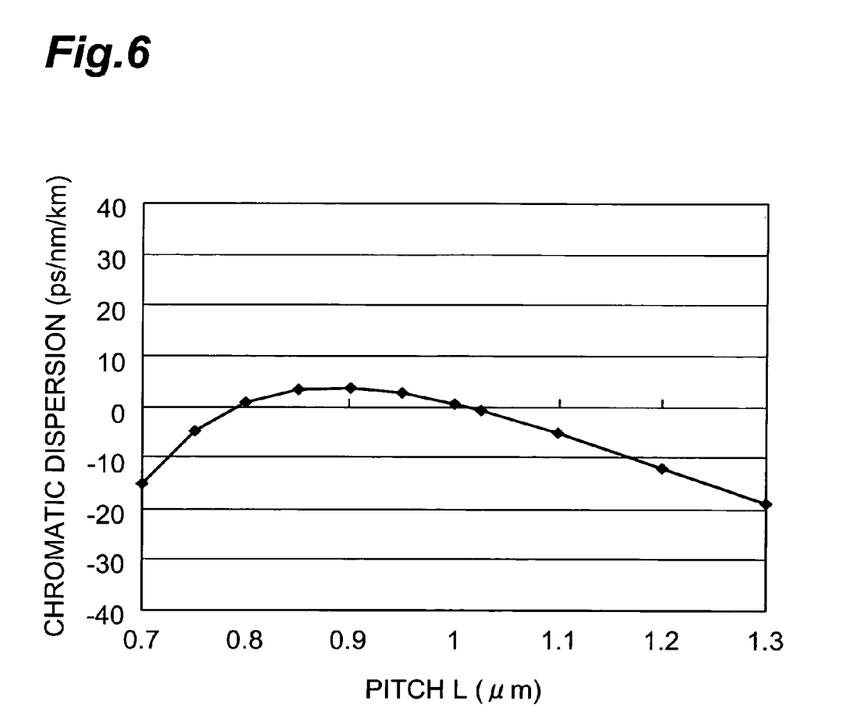
FIG. 6 is a graph illustrating the relationship between the chromatic dispersion and the pitch L, with respect to the optical fiber according to the first embodiment illustrated in FIG. 2.
Figure 7:
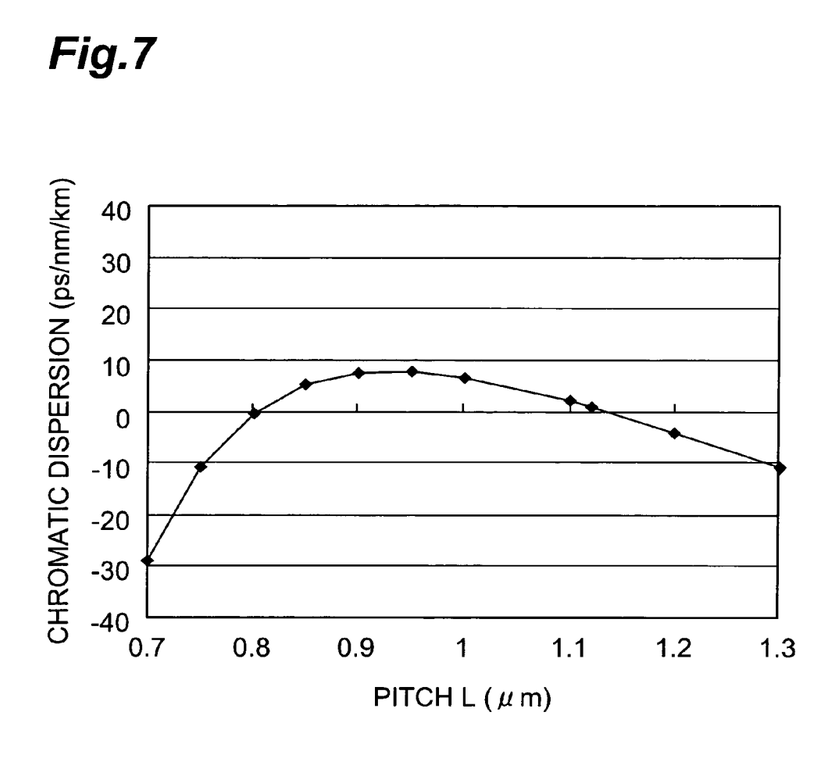
FIG. 7 is a graph illustrating the relationship between the chromatic dispersion and the pitch L, with respect to the optical fiber according to the second embodiment illustrated in FIG. 3.

First, there will be described the pitch dependences of the chromatic dispersions of the optical fibers 10, 20 and 30. FIG. 5 is a graph illustrating the relationship between the chromatic dispersion and the pitch L, with respect to the conventional optical fiber 10 illustrated in FIG. 1. FIG. 6 is a graph illustrating the relationship between the chromatic dispersion and the pitch L, with respect to the optical fiber 20 according to the first embodiment illustrated in FIG. 2. FIG. 7 is a graph illustrating the relationship between the chromatic dispersion and the pitch L with respect to the optical fiber 30 according to the second embodiment illustrated in FIG. 3. Hereinafter, there will be described advantages of the optical fibers 20 and 30 according to the respective embodiments over the conventional optical fiber 10, with reference to these views.

When the optical fibers 10, 20, 30 which are holey fibers are utilized for high-nonlinearity applications, it is preferable that the cross-section of their core region are reduced to confine guided light in a narrower range, in order to enhance the nonlinearity of the optical fibers. Further, in order to utilize the nonlinearity phenomenon, it is necessary to design the configurations of the optical fibers such that the dispersion at to-be-used wavelengths is zero.

When the conventional optical fiber 10 illustrated in FIG. 1 is designed as a highly-nonlinear fiber, for example, for a wavelength of 700 nm, the ratio (d/L) between the pitch L of the arranged holes 31 and the hole diameter d is 0.8 and the pitch L is 1.2 µm. In this case, the nonlinearity coefficient γ is about 90 (/W/km), which is four times those of common nonlinear fibers (γ=20 to 25 (/W/km)). Even though the optical fiber 10 has such an excellent characteristic, it also has the problem of significant difficulty of controlling the dispersion value during manufacturing. FIG. 5 illustrates the result of simulations for the pitch dependence of the chromatic dispersion value of the conventional optical fiber 10 having a ratio (d/L) of 0.8. This shows that the pitch dependence of the chromatic dispersion is large around the zero-dispersion and a slight fluctuation of the pitch L causes a large fluctuation in the chromatic dispersion value, in the case of the conventional optical fiber 10. In order to keep the chromatic dispersion value being within the range of −5 ps/nm/km to +5 ps/nm/km, it is necessary to control the pitch L being kept within the range of 1.20 to 1.25 µm, which will increase the difficulty of practical manufacturing.

On the contrary, in the case of the optical fiber 20 according to the first embodiment illustrated in FIG. 2, even if the pitch L is fluctuated to some degree, the chromatic dispersion value will be hardly fluctuated. FIG. 6 illustrates the relationship between the chromatic dispersion value and the pitch L, with respect to the optical fiber 20 according to the first embodiment, in the case where the ratio (d/L) is 0.8. This illustrates the result of simulations for a wavelength of 785 nm, illustrating that the chromatic dispersion is kept within the range of −5 ps/nm/km to +5 ps/nm/km over the pitch-L range of 0.75 to 1.1 µm, which significantly reduces the difficulty of manufacturing in comparison with the conventional optical fiber 10. In the case where an ultrashort pulse is introduced into the optical fiber and the nonlinearity phenomenon thereof is utilized to generate white light (SC light) over a wide wavelength range, it is necessary that the chromatic dispersion is kept within the range of −20 to +20 ps/nm/km and, more preferably, the chromatic dispersion is kept within the range of −10 to +10 ps/nm/km. The optical fiber 20 according to the first embodiment can satisfy the aforementioned condition over the pitch range of 0.7 to 1.3 µm. The aforementioned pitch range can be sufficiently realized in manufacturing.

Even when holes are provided in a somewhat different manner in the second layer and the layers outside thereof, this will not exert significant influences on the aforementioned characteristics. This is because the optical characteristics such as chromatic dispersion are substantially determined by the geometrical configuration near the core. FIG. 7 illustrates the result of simulations for the relationship between the chromatic dispersion and the pitch L at a wavelength of 785 nm, in the case of the configuration of the optical fiber 20 according to the second embodiment illustrated in FIG. 3 in which the ratio (d/L) is 0.8. The optical fiber 20 according to the second embodiment exhibits pitch dependence of the chromatic dispersion which is slightly greater than that of the first embodiment. However, the pitch dependence thereof is at a level without any problem practically. Since the third layer and the layers outside thereof have less influence on the optical characteristics than the second layer, some of the holes in these layers can be filled with glass without causing influences on the dispersion.

Figure 8:
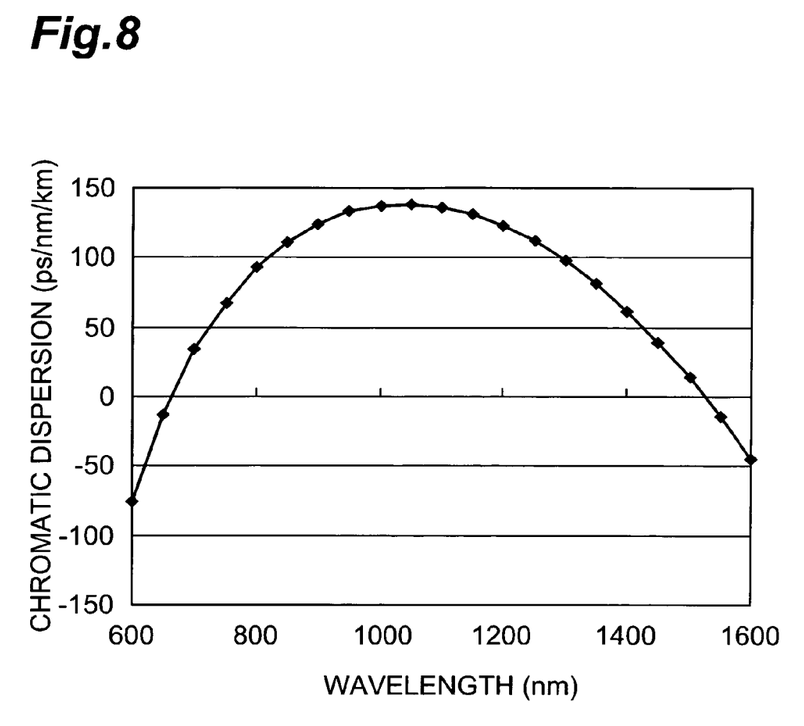
FIG. 8 is a graph illustrating the relationship between the chromatic dispersion and the wavelength, with respect to the conventional optical fiber illustrated in FIG. 1.
Figure 9:
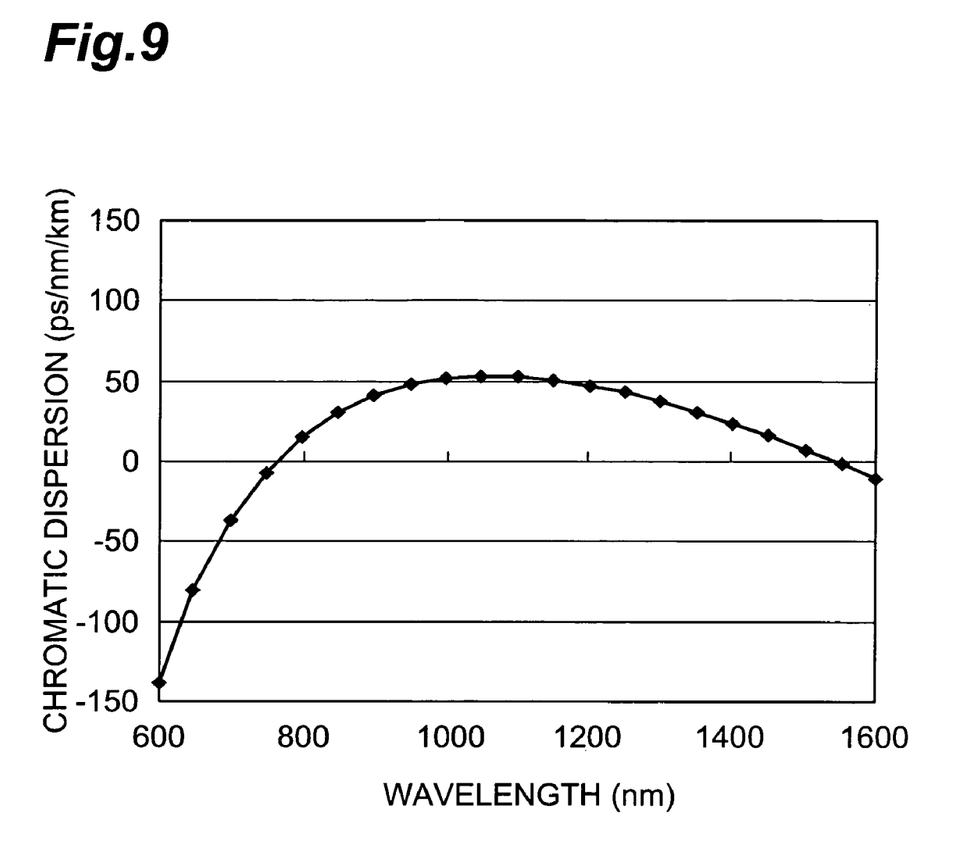
FIG. 9 is a graph illustrating the relationship between the chromatic dispersion and the wavelength, with respect to the optical fiber according to the first embodiment illustrated in FIG. 2.
Figure 10:
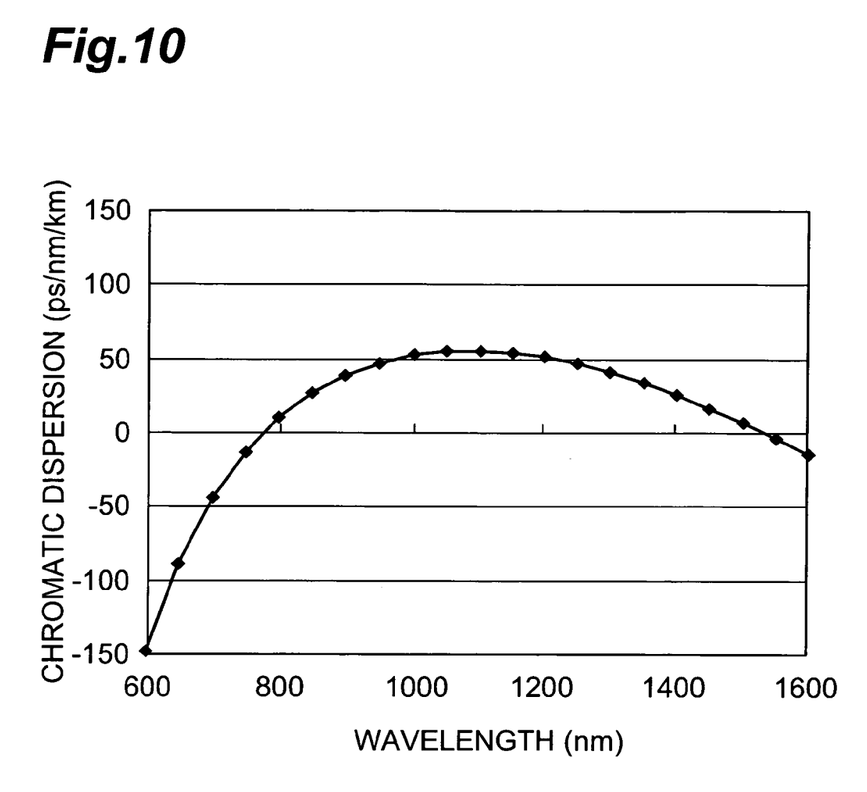
FIG. 10 is a graph illustrating the relationship between the chromatic dispersion and the wavelength, with respect to the optical fiber according to the second embodiment illustrated in FIG. 3.

Subsequently, there will be described the wavelength dependencies of the chromatic dispersions of the optical fibers 10, 20 and 30. FIG. 8 is a graph illustrating the relationship between the chromatic dispersion and the wavelength, with respect to the conventional optical fiber 10 illustrated in FIG. 1. FIG. 9 is a graph illustrating the relationship between the chromatic dispersion and the wavelength, with respect to the optical fiber 20 according to the first embodiment illustrated in FIG. 2. FIG. 10 is a graph illustrating the relationship between the chromatic dispersion and the wavelength, with respect to the optical fiber 30 according to the second embodiment illustrated in FIG. 3. Hereinafter, there will be described advantages of the optical fibers 20 and 30 in contrast to the respective embodiments over the conventional optical fiber 10, with reference to these views.

In the case of utilizing the nonlinear phenomenon, the magnitude of the dispersion slope does matter. It is desirable that the chromatic dispersion value of the optical fiber is near zero dispersion over all the to-be-used wavelength range. Accordingly, it is desirable that the change in the chromatic dispersion value with the wavelength (namely, the dispersion slope) is smaller.

FIG. 8 illustrates, as an example, the result of simulations for the relationship between the chromatic dispersion value and the wavelength, with respect to the conventional optical fiber 10 illustrated in FIG. 1 having a pitch L of 1.22 µm and a ratio (d/L) of 0.8. In this case, the dispersion slope at the zero dispersion near a wavelength of 700 nm is 0.92 ps/nm$^2$/km, which is relatively high.

On the other hand, FIG. 9 illustrates, as an example, the result of simulations for the optical fiber 20 according to the first embodiment illustrated in FIG. 2 having a pitch L of 1.03 µm and a ratio (d/L) of 0.8. In this case, the dispersion slope at the zero dispersion near a wavelength of 700 nm is 0.43 ps/nm$^2$/km, which is substantially half that of the conventional configuration.

Further, FIG. 10 illustrates, as an example, the result of simulations for the optical fiber 30 according to the second embodiment illustrated in FIG. 3 having a pitch L of 1.12 µm and a ratio (d/L) of 0.8. In this case, the dispersion slope at the zero dispersion near a wavelength of 700 nm is 0.46 ps/nm$^2$/km, which is substantially half that of the conventional configuration, similarly to the result of simulations of FIG. 9.

As described above, with the optical fibers 20 and 30 according to the first and second embodiments, it is possible to reduce the change of the wavelength dispersion value with the change of the pitch L, thus increasing the manufacturing tolerance, as compared with the conventional optical fiber 10. Further, it is possible to decrease, by half, the dispersion slope near the zero dispersion, which facilitates the utilization thereof for applications utilizing nonlinear phenomena.

Figure 11:
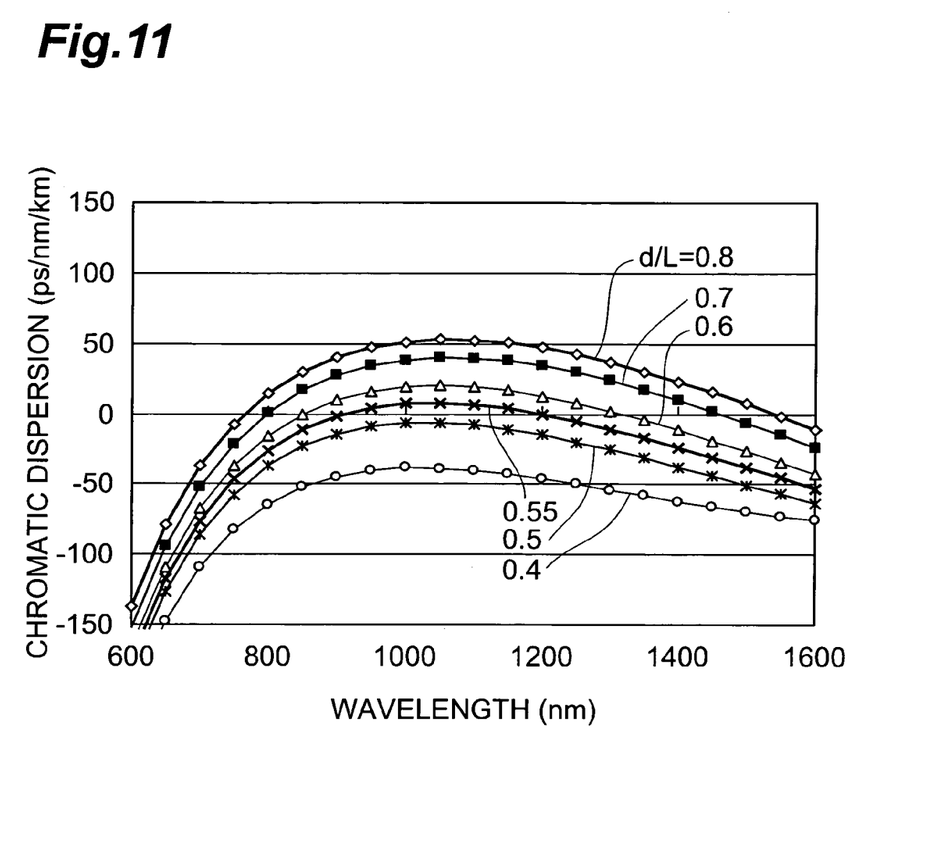
FIG. 11 is a graph illustrating the relationship between the chromatic dispersion and the ratio (d/L), with respect to the optical fiber according to the first embodiment illustrated in FIG. 2.

FIG. 11 is a graph illustrating the relationship between the chromatic dispersion and the ratio of (d/L), with respect to the optical fiber 20 according to the first embodiment illustrated in FIG. 2, under a condition where the pitch-L dependence of the chromatic dispersion is small. As can be seen from FIG. 11, when the ratio (d/L) is 0.5 or less, the dispersion value is always negative, which is not useful for providing a nonlinear phenomenon. In consideration of manufacturing errors, it is preferable that the ratio of (d/L) is 0.6 or more.

(Second Simulations with Computer)

Figure 12:
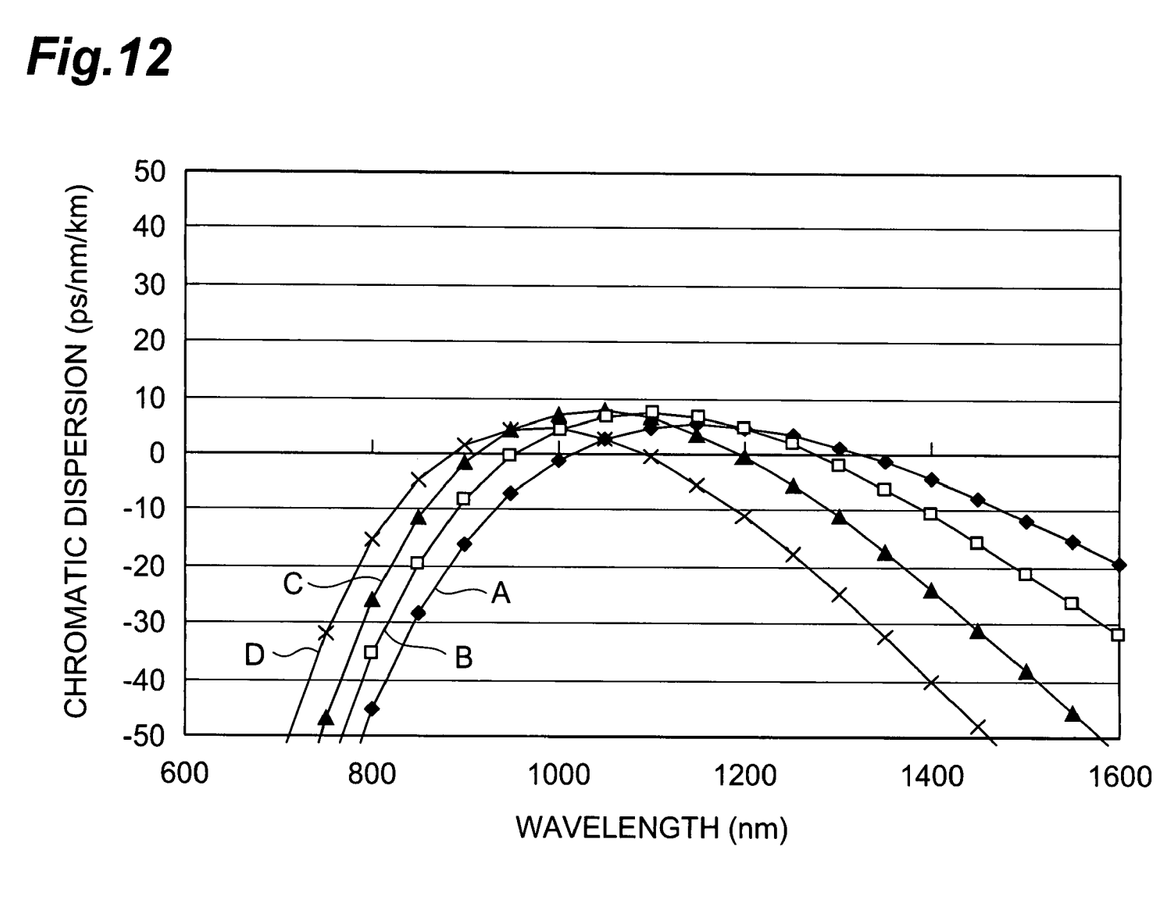
FIG. 12 is a graph illustrating the relationship between the chromatic dispersion and the wavelength, with respect to the optical fiber according to the first embodiment illustrated in FIG. 2.

Further, there will be described the result of simulations for the optical fiber 20 according to the first embodiment (FIG. 2), in the case of realizing a holey fiber having a dispersion characteristic close to the zero dispersion over a wider range around a wavelength of 1 µm in the near-infrared region. FIG. 12 is a graph illustrating the relationship between the chromatic dispersion and the wavelength, with respect to the optical fiber 20 according to the first embodiment illustrated in FIG. 2. There is illustrated, in FIG. 12, the relationship between the chromatic dispersion and the wavelength for four cases A to D. In the case A, the ratio of (d/L) is 0.45 and the pitch L is 1.23 µm. In the case B, the ratio of (d/L) is 0.50 and the pitch L is 1.13 µm. In the case C, the ratio of (d/L) is 0.55 and the pitch L is 1.03 µm. In the case D, the ratio (d/L) is 0.60 and the pitch L is 0.93 µm.

As can be seen from FIG. 12, in all the cases of A to D, the chromatic dispersion is kept within the range of −20 ps/nm/km to +20 ps/nm/km over the wavelength range of 900 to 1200 nm. Particularly, in the cases of B and C, the chromatic dispersion is kept within the range of −10 ps/nm/km to +10 ps/nm/km, over the wavelength range of 900 to 1200 nm.

As described above, with the optical fibers 20, 30 according to the first and second embodiments, it is possible to realize a holey fiber with a small absolute chromatic-dispersion value and large nonlinearity over a range near a wavelength of 1 µm in the near-infrared region. For example, the optical fibers 20, 30 can be suitably utilized as mediums for generating SC light over a 1-µm-wavelength range.

As described above, with the present invention, there is provided an optical fiber capable of having a large manufacturing tolerance and having large nonlinearity over the wavelength range of 700 to 900 nm in the near-infrared range. Further, there is provided an optical fiber capable of having a dispersion characteristic close to zero dispersion and large linearity over a wider range around a wavelength of 1 µm in the near-infrared range.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber comprising:
   a solid core region extending along a predetermined axis; and
   a cladding region provided on an outer periphery of said core region, said cladding region being provided with plural holes that extend along said core region and that are arranged so as to constitute plural layers about said core region in a cross-section orthogonal to the predetermined axis,
   wherein, in the cross-section orthogonal to the predetermined axis, at least the holes, that are among said plural holes in said cladding region and constitutes the innermost layer closest to said core region, are arranged such that the arrangement thereof has N-fold rotational symmetry about said core region (N is an integer of three or more) while the holes constituting the respective layers except the innermost layer are arranged such that the arrangement thereof has 2N-fold rotational symmetry about said core region, wherein the holes constituting one of the plural layers are arranged with a pitch of L, and the ratio (d/L) between the pitch L and the hole diameter d is 0.55 or more, and wherein said optical fiber has a chromatic dispersion between −20 ps/nm/km and +20 ps/nm/km over an entire wavelength range of 900 nm to 1200 nm.

2. An optical fiber according to claim 1, wherein the ratio (d/L) is 0.6 or more.

3. An optical fiber according to claim 1, wherein the pitch L falls within the range between 0.7 μm and 1.3 μm.

4. An optical fiber according to claim 1, wherein said optical fiber has a twist about the predetermined axis.

5. An optical fiber according to claim 1, wherein the orientation of the twist in said optical fiber is reversed at least once along the predetermined axis.

6. An optical fiber comprising:
a solid core region extending along a predetermined axis; and
a cladding region provided on an outer periphery of said core region, said cladding region being provided with plural holes that extend along said core region and that are arranged so as to constitute plural layers about said core region in a cross-section orthogonal to the predetermined axis,
wherein said optical fiber has, over an entire wavelength range of 900 nm to 1200 nm, a chromatic dispersion between −20 ps/nm/km and +20 ps/nm/km.

7. An optical fiber according to claim 6, wherein said optical fiber has the chromatic dispersion between −10 ps/nm/km and +10 ps/nm/km in the wavelength range.

8. An optical fiber according to claim 6, wherein, in the cross-section orthogonal to the predetermined axis, at least the holes, that are among said plural holes in said cladding region and constitutes the innermost layer closest to said core region, are arranged such that the arrangement thereof has N-fold rotational symmetry about said core region (N is an integer of three or more) while the holes constituting the respective layers except the innermost layer are arranged such that the arrangement thereof has 2N-fold rotational symmetry about said core region.

9. An optical fiber according to claim 8, wherein the holes constituting one of said plural layers are arranged with a pitch of L, and the ratio (d/L) between the pitch L and the hole diameter d falls within the range between 0.45 and 0.60.

10. An optical fiber according to claim 8, wherein the holes constituting one of the plural layers are arranged with a pitch of L, and the pitch L falls within the range between 0.9 μm and 1.3 μm.

11. An optical fiber according to claim 6, wherein said optical fiber has a twist about the predetermined axis.

12. An optical fiber according to claim 11, wherein the orientation of the twist in said optical fiber is reversed at least once along the predetermined axis.

* * * * *